United States Patent [19]

Reed et al.

[11] Patent Number: 5,781,673
[45] Date of Patent: Jul. 14, 1998

[54] WDM OPTICAL FIBER COMMUNICATION SYSTEM WITH IMPROVED DISPERSION COMPENSATION

[75] Inventors: William Alfred Reed, Summit; Ashish Madhukar Vengsarkar, Berkeley Heights, both of N.J.

[73] Assignee: Lucent Technologies Inc., Murray Hill, N.J.

[21] Appl. No.: 796,004

[22] Filed: Feb. 5, 1997

[51] Int. Cl.$^6$ .................................................. G02B 6/28
[52] U.S. Cl. ............................ 385/24; 385/123; 359/159
[58] Field of Search ............................... 385/24, 23, 31, 385/122, 128, 123–126, 141–145; 359/109, 115, 124, 152, 153, 154, 159, 180, 189

[56] References Cited

U.S. PATENT DOCUMENTS 5,361,319  11/1994  Antos et al. ............................ 385/123
5,448,674   9/1995  Vengsarkar et al. .................... 385/123

OTHER PUBLICATIONS

"One–Third Terabit/s Transmission Through 150 km of Dispersion–Managed Fiber", by A. R. Chraplyvy et al., *IEEE Photonics Technology Letters*, vol. 7, No. 1, Jan. 1995, pp. 98–100.

"Fiber Bragg Grating Fabrication for Dispersion Slope Compensation", by J. A. R. Williams et al., *IEEE Photonics Technology Letters*, vol. 8, No. 9, Sep. 1996, pp. 1187–1189.

"Higher Order Dispersion Equaliser of Dispersion Shifted Fibre Using A Lattice–form Programmable Optical Filter", by K. Takiguchi et al., *Electronics Letters*, vol. 32, No. 8, 11th Apr. 1996, pp. 755–757.

"Calculation of Modes in an Optical Fiber Using the Finite Element Method and EISPACK", by T. A. Lenahan, *The Bell System Technical Journal*, vol. 62, No. 9, Part 1, Nov. 1983.

*Primary Examiner*—Phan T. H. Palmer
*Attorney, Agent, or Firm*—Eugen E. Pacher

[57] ABSTRACT

Disclosed is an improved WDM optical fiber communication system that comprises, in addition to dispersion compensating fiber, dispersion slope compensating fiber (DSCF) selected to provide substantially all channels of the WDM system with nominally zero total chromatic dispersion. Exemplary refractive index profiles for DSCF are disclosed. Such fibers exemplarily can be produced by MCVD.

10 Claims, 2 Drawing Sheets

WDM OPTICAL FIBER COMMUNICATION SYSTEM WITH IMPROVED DISPERSION COMPENSATION

FIELD OF THE INVENTION

This invention pertains to dispersion compensated wavelength division multiplexed (WDM) optical fiber communication systems.

BACKGROUND

Multichannel WDM optical fiber communication systems are promising candidates for future high bit rate/long distance systems. The principal limiting factor in high bit rate (e.g., >10 Gbps per channel), long distance (e.g., several hundred kilometers) systems is chromatic dispersion.

In long-haul systems the following have to be considered:
i) if the fiber has non-zero chromatic dispersion, then pulse spreading results, with attendant intersymbol interference;
ii) if chromatic dispersion is zero everywhere along the transmission fiber then non-linear effects such as four-wave-mixing can result in degraded system performance.

A key advance in the implementation of multi-channel WDM systems has been the use of "dispersion management". In view of the above recited conflicting demands, the basic principle of dispersion management is to keep local dispersion non-zero but making overall system dispersion substantially zero. See, for instance, A. R. Chraplyvy et al., *IEEE Photonics Technology Letters*, Vol. 7, p. 98,1995.

For example, one dispersion management scheme uses a conventional fiber with a dispersion (D) of ≈ +2 ps/nm-km at the system wavelengths (e.g., about 1550 nm); after a few hundred kilometers, when the cumulative dispersion has reached several hundred ps/nm-km, one compensates the dispersion with an approximately equal length of fiber having dispersion of ≈ −2 ps/nm-km.

In another scheme, a conventional fiber with zero dispersion at 1310 nm and a dispersion of +16 ps/nm-km at 1550 nm is used. For use in the 1550 nm transmission window, a dispersion compensating fiber (DCF) with high negative dispersion is added in order to reduce or eliminate the chromatic dispersion. Typically, the dispersion of the DCF is more negative than about −90 ps/nm-km, and an appropriate length (e.g., about 10 km) of the DCF is inserted into the transmission path every 50–60 km. DCF are known. See, for instance, U.S. Pat. Nos. 5,448,674 and 5,361,319.

Prior art dispersion management schemes, while being effective for single channel fiber communication systems, have at least one shortcoming with regard to multichannel systems. Specifically, complete cancellation of dispersion in all channels at the end of the system is not easily accomplished, primarily because the dispersion slope (dD/dλ, also designated D') in the compensating fibers typically cannot meet the two requirements of being high in magnitude and negative in sign.

For example, currently available DCF's have a dispersion D=−96 ps/nm-km and a slope D'=−0.2 ps/nm²-km. For complete dispersion cancellation of all WDM channels, in a 30 nm spectral range, and assuming that the transmission fiber is conventional 5D® fiber, the requirement is $D_{SD}/D'_{SD}=D_{DCF}/D'_{DCF}$. Since $D'_{SD}=0.07$ ps/nm².km, this requirement necessitates $D'_{DCF}$ to be −0.4 ps/nm²-km. This difference in the slopes is responsible for unequal compensation of the channels in a WDM system.

The main reason why fibers with high negative dispersion and high negative slope are not available is manufacturing difficulty. Small variation in fiber designs having these properties typically lead to large changes of fiber properties, and hence such designs are typically not reliably manufacturable.

By way of another example, with alternating +2 and −2 ps/nm-km dispersion, the dispersion slopes of both fibers are positive, thus leading to similar consequences.

In view of the above discussed shortcomings of the prior art, it is evident that a dispersion slope compensator would be highly desirable. Such a compensator exemplarily would be inserted at the end of a fiber span, and would have zero dispersion at a wavelength (designated λm) at which complete dispersion compensation is attained by conventional means, and a high negative slope D' around λm.

Devices that can serve as dispersion slope compensators are known. For instance, J. A. R. Williams et al., *IEEE Photonics Technology Letters*, Vol. 8, p. 1187, (1996) disclose a grating-based slope compensator, and K. Takiguchi et al., *Electronics Letters*, Vol. 32, p. 755 (1996) disclose planar lightguide circuits. However, the grating-based compensator typically has limited bandwidth that does not cover the entire gain spectrum (~30 nm) of Er-doped fiber amplifiers, their fabrication requires tight tolerances in phase mask manufacture and, once fabricated, they provide a fixed dispersion slope. The planar lightguide compensator also has drawbacks. It requires active control in the form of thermo-optic phase shifters, and has relatively small bandwidth and relatively high insertion loss.

In view of the importance of dispersion compensation in WDM optical fiber communication systems, it would be highly desirable to have available a simple, rugged, relatively inexpensive, passive dispersion slope compensator having relatively wide bandwidth and relatively low insertion loss. This application discloses such a compensator, and WDM optical fiber communication systems that comprise the compensator.

SUMMARY OF THE INVENTION

In a broad aspect the invention is embodied in an improved WDM optical fiber communication system. The system has N channels (N>1), and comprises a length of dispersion slope compensating fiber selected such that at the receiver of the system substantially all N channels are nominally free of dispersion.

More specifically, the system comprises a transmitter, a receiver, and an optical fiber transmission path that signal-transmissively connects the transmitter and receiver. The system is adapted for signal transmission in N transmission channels of wavelengths $\lambda_1 \ldots \lambda_N$. The transmission path comprises first single mode optical fiber having non-zero chromatic dispersion of a first mathematical sign at the wavelengths $\lambda_1 \ldots \lambda_N$, and further comprises dispersion compensating second single mode optical fiber having non-zero chromatic dispersion of a second mathematical sign at the wavelengths $\lambda_1 \ldots \lambda_N$.

Significantly, the transmission path further comprises third single mode optical fiber, designated dispersion slope compensating fiber or DSCF, said fiber having a dispersion slope in the wavelength range $\lambda_1 \ldots \lambda_N$, the dispersion, dispersion slope and the length of the DSCF in the transmission path being selected such that the total chromatic dispersion of the transmission path at substantially all of the wavelengths $\lambda_1 \ldots \lambda_N$ is nominally zero. Exemplarily the spectral region $\lambda_1 \ldots \lambda_N$ is at least 12 nm.

Typically, the dispersion slope of the DSCF is more negative than −0.1 ps/nm².km, preferably more negative than −0.5 or even −1.0 ps/nm².km. DSCF with dispersion slope less negative than −0.1 ps/nm².km are typically not of commercial interest.

The total chromatic dispersion of a channel is "nominally zero" if the dispersion is substantially due only to unintended design or manufacturing imperfections. In many cases the dispersion compensating fiber will be selected such that the total chromatic dispersion of one channel (exemplarily the center channel) is nominally zero. The wavelength of this channel will be designated $\lambda_m$. More broadly, $\lambda_m$ is the wavelength of the channel that has minimum (in absolute value) total chromatic dispersion in the absence of dispersion slope compensation.

DETAILED DESCRIPTION

Figure 1:
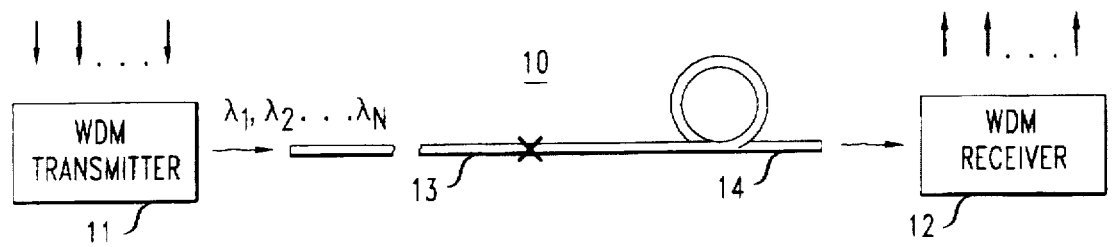
FIG. 1 schematically depicts a WDM optical fiber communication system according to the invention.

FIG. 1 schematically depicts an exemplary WDM optical fiber communication system 10 according to the invention. The system comprises WDM transmitter 11, WDM receiver 12, and an optical fiber transmission path that signal transmissively connects the transmitter and the receiver. The transmission path comprises conventional single mode transmission fiber and, typically, an appropriate length of DCF (collectively designated 13), and a predetermined length of dispersion slope compensating fiber (DSCF) 14.

Figure 2:
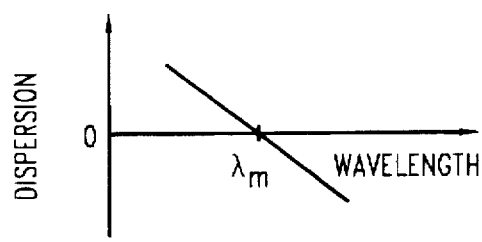
FIG. 2 shows the dispersion of an exemplary dispersion slope compensating fiber (DSCF)

The transmitter receives a multiplicity (e.g., N) inputs and has a multiplicity of optical output channels of wavelengths $\lambda_1, \lambda_2 \ldots \lambda_N$ (where N is an integer greater than 1). The receiver accepts the multiplicity of optical input channels and has a multiplicity of demultiplexed outputs. The fiber transmission path typically comprises a variety of conventional components and/or features (e.g., optical amplifiers, add/drop nodes, dispersion compensating fiber, gratings, isolators, couplers, taps) that are not shown in FIG. 1. The DSCF typically is disposed at or close to the downstream end of the transmission path, and is joined to the transmission fiber in conventional fashion, indicated by an "X". As will be discussed in detail below, the DSCF is single mode (at the system's wavelength, e.g., about 1.55 µm) optical fiber having zero dispersion at a wavelength $\lambda_m$ (typically, but not necessarily the wavelength of the center channel), and a relatively large (in absolute value) negative dispersion slope D', as shown schematically in FIG. 2.

The invention will now be further explained by means of examples.

Consider a WDM system of span length 640 km, using conventional positive and negative dispersion True Wave® transmission fiber. The former has +2 ps/nm .km dispersion at $\lambda_m$, the latter has −2 ps/nm.km dispersion at $\lambda_m$, exemplarily 1556 nm. The first 320 km of the span are positive dispersion fiber, the second 320 km are negative dispersion fiber. The center channel ($\lambda_m$) thus is perfectly compensated, i.e., it has nominally zero overall dispersion.

Assume that the channels are uniformly spaced, with total channel coverage of 30 nm. The dispersion for the first, center and last channel will be designated $D_1$, $D_m$ and $D_N$, respectively, and it is assumed that $\lambda_1 < \lambda_m < \lambda_N$. Thus, $\lambda_1 = \lambda_m - 15$ nm, and $\lambda_N = \lambda_m + 15$ nm.

Figure 3:
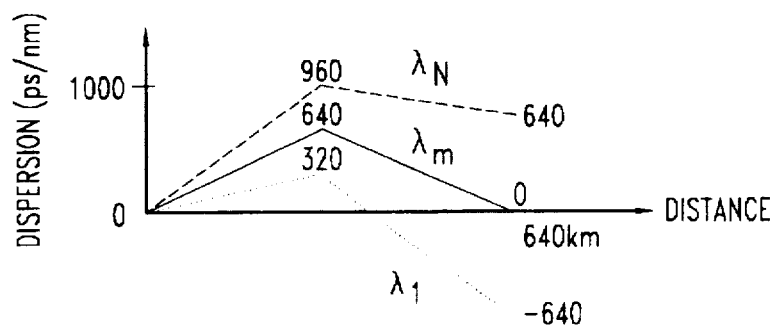
FIG. 3 shows the dispersion of three channels of an exemplary dispersion compensated fiber.

Typical dispersion values (in ps/nm.km) for positive (and negative) dispersion True Wave fibers are $D_1 = 1(-3)$, $D_m = 2(-2)$, and $D_N = 3(-1)$. The dispersion map for such a system is shown in FIG. 3, which shows dispersion as a function of distance from the transmitter. As can be seen from FIG. 3, at the receiver location channels I and N have accumulated −640 ps/nm and +640 ps/nm of dispersion, respectively.

The presence of residual dispersion in all channels other than the center channel would (at least for anticipated high bit rates, e.g., >10 Gb/s) lead to undesirable penalties in system performance. This is avoided by introduction of a DSCF.

The required dispersion slope of the DSCF is readily determined from the above data. It is the sum of the residual dispersions of the two extreme channels $\lambda_1$ and $\lambda_N$, divided by the wavelength difference between the extreme channels, namely $((-640)-(+640))$ps/nm.km/30 nm. This yields D'=−43 ps/nm².km.

As is well known, computational techniques exist that enable the practitioner to design optical fiber having desired waveguiding characteristics, including a desired value of D'. See, for instance, T. Lenahan, *Bell System Technical Journal*, Vol. 62, p. 2663 (1983).

Figure 4:
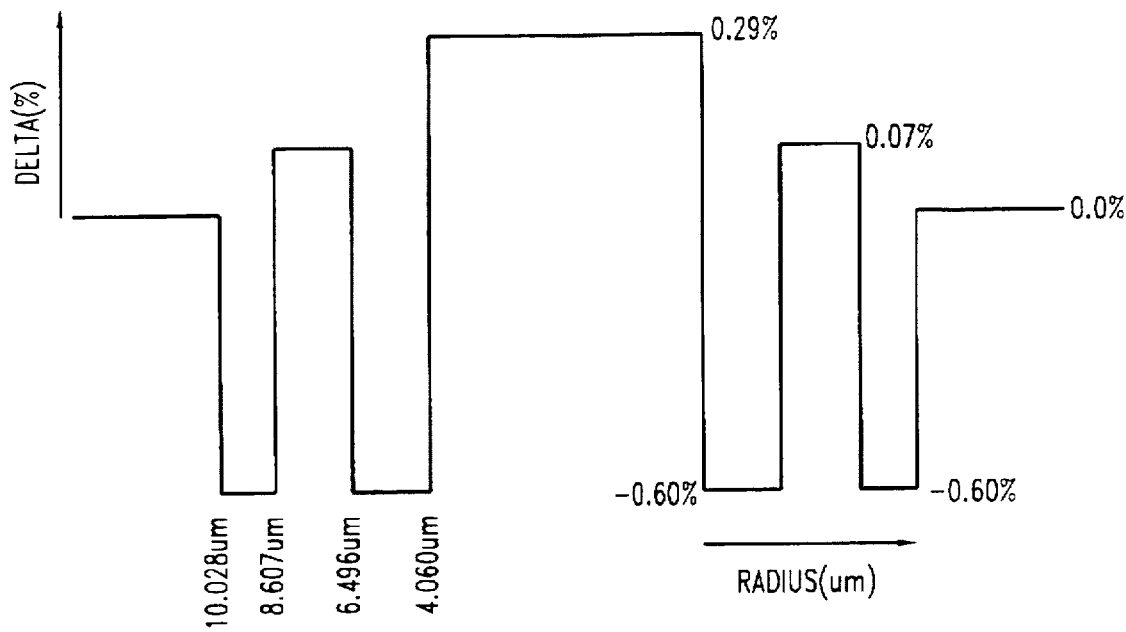
FIG. 4 shows the refractive index profile of a DSCF for the system of FIG. 3.

FIG. 4 shows the normalized refractive index profile of an exemplary single mode optical fiber having the characteristics required of the DSCF in the above example. The fiber can be manufactured using a conventional technique for fiber preform manufacture, with MCVD being our preferred technique. The fiber is a silica-based fiber having germania in the raised index regions ($\Delta > 0$), and fluorine in the depressed index regions ($\Delta < 0$), where the normalized refractive index difference $\Delta$ is $(n_i - n_o)/n_o$, with $n_i$ and $n_o$ being the refractive index of a given layer and the refractive index of pure vitreous silica, respectively. In the profile of FIG. 4, the $\Delta$'s for the various layers (in sequence from the fiber core outward) are 0.29, −0.60, 0.07, −0.06 and 0.0%, respectively. The corresponding radii are 4.06, 6.496, 8.607 and 10.028 µm or, in terms of the core radius a, 1.6 a, 2.12 a, 2.47 a, where a =4.06 µm. This fiber has D'=−1.129 ps/nm².km at 1556 nm. Thus, approximately 38 km of this fiber, joined to the downstream end of the transmission path, compensates for the residual dispersion in the outlying channels ($\lambda_1, \ldots \lambda_{m-1}, \lambda_{m+1}, \ldots \lambda_N$) of the exemplary 640 km WDM system. Fiber as described above can have loss of about 0.25 dB/km. Thus, the total added loss can be as low as about 9.5 dB.

By way of a further example, consider a WDM optical fiber communication system that uses conventional 5D transmission fiber, with zero dispersion at 1310 nm, and with 16 ps/nm.km dispersion at the center channel ($\lambda_m = 1545$ nm), and that also uses the above mentioned DCF. The total channel coverage is again 30 nm, and the center channel is perfectly compensated by the DCF. The dispersion characteristics of 5D fiber and of the DCF are known, and yield the following respective dispersion values (in ps/nm.km): $D_1 = 15$, $D_m = 16$, $D_N = 17$; and $D_1 = -93$, $D_m = -96$, $D_N = -99$, where the subscripts 1, m and N refer again to the channel having the shortest wavelength, the center channel, and the channel having the longest wavelength, respectively.

Figure 5:
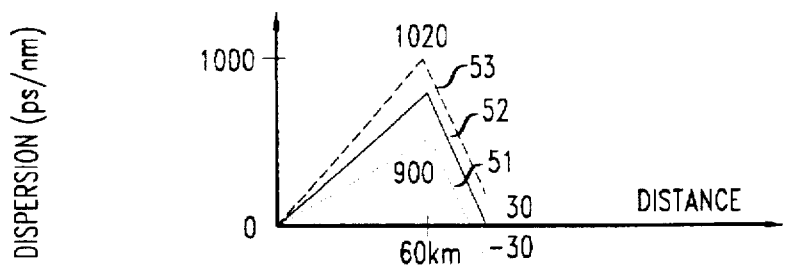
FIG. 5 shows the dispersion of 3 channels of another exemplary dispersion compensated fiber.

Consider that the exemplary system has 60 km span lengths, followed by 10 km of DCF. The dispersion map for one span of such a system is shown in FIG. 5, wherein numerals 51–53 refer to $\lambda_1$, $\lambda_m$ and $\lambda_N$, respectively. As shown by FIG. 5, dispersion is perfectly compensated for $\lambda_m$, but $\lambda_1$, and $\lambda_N$ have residual dispersion of −30 and +30 ps/nm, respectively. In a long distance system, the residual dispersion would accumulate, to the detriment of system performance. The residual dispersion can be compensated by means of a DSCF.

If the system is 1800 km long then, using the approach of the previous example, the appropriate DSCF has D'=−60 ps/nm².km.

Figure 6:
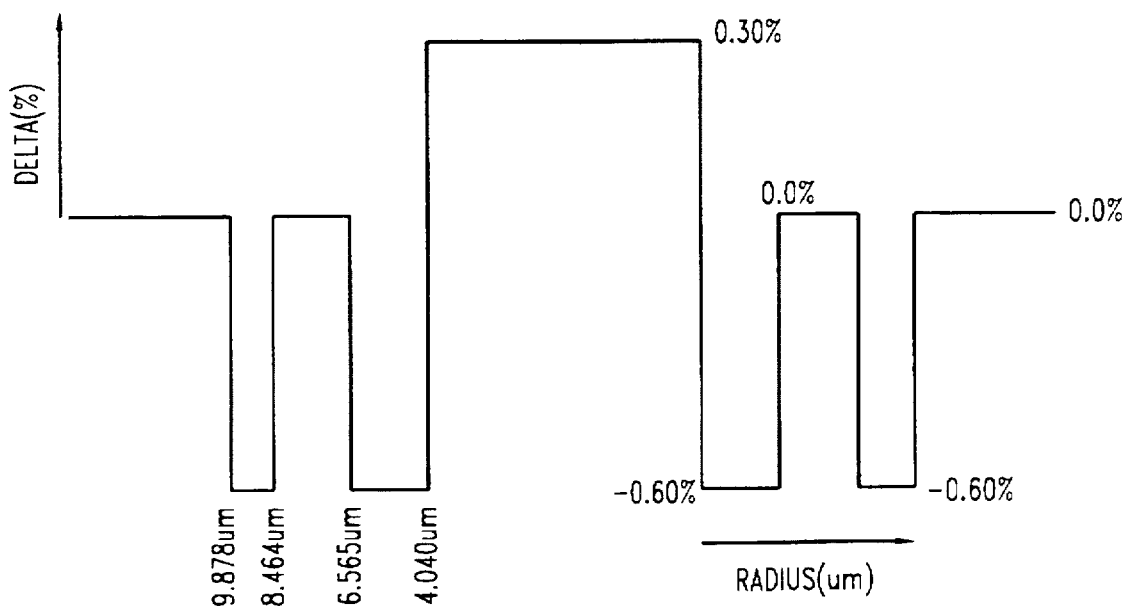
FIG. 6 shows the refractive index profile of a DSCF for the system of FIG. 5.

This slope can be provided by a silica-based single mode fiber having the refractive index profile shown in FIG. 6. The figure shows the normalized refractive index $\Delta$ as a function of radius, substantially as in FIG. 4. The $\Delta$ values are 0.30, −0.60, 0.00 and −0.60% from core to outer cladding, and the corresponding radii are a, 1.62 a, 2.09 a, and 2.44 a, where the core radius a =4.04 μm. The fiber has D'=−1.607 ps/nm².km. Thus, 37 km of the fiber, added at the downstream end of the 1800 km system, will compensate for the residual dispersion in the outlying channels. The added loss again can be as low as 9 dB.

The above examples are illustrative of the invention. Those skilled in the art will be readily able to modify the examples to suit particular situations.

Dispersion slope compensation according to the invention is not limited to WDM systems that are dispersion compensated to have a nominally zero dispersion channel. For instance, a system can be partially compensated, i.e., have compensation such that all channels have significant dispersion, the minimum dispersion channel being the $\lambda m$ channel. Using the above disclosed approach, it is a simple matter to determine the dispersion of one channel (typically $\lambda m$) and the dispersion slope that will make the dispersion of all channels nominally zero at the receiver, and to design a DSCF that has this dispersion slope.

Furthermore, it will be understood that there is no requirement that the transmission path contains all of the first single mode fiber as a continuous length, all of the second single mode fiber as a continuous length, and/or all of the DSCF as a continuous length. Indeed, all of these fibers can be mixed in any desired way, provided only that the pieces add up to the required length of each.

The invention claimed is:

1. A wavelength division multiplexed optical fiber communication system comprising a transmitter, a receiver, and an optical fiber transmission path that signal-transmissively connects said transmitter and receiver, said system adapted for signal transmission in N transmission channels of wavelengths $\lambda_1, \ldots \lambda_N$, where N is an integer greater than 1, wherein said transmission path comprises first single mode optical fiber having non-zero chromatic dispersion of a first mathematical sign at said wavelengths $\lambda_1 \ldots \lambda_N$, and further comprises dispersion compensating second single mode optical fiber having non-zero chromatic dispersion of a second mathematical sign at said wavelengths $\lambda_1 \ldots \lambda_N$;

Characterized in that
the transmission path further comprises a third single mode optical fiber, to be designated dispersion slope compensating fiber or DSCF, said DSCF having a dispersion slope in the wavelength range $\lambda_1 \ldots \lambda_N$, said dispersion slope and the length of the DSCF in the transmission path selected such that the total chromatic dispersion of the transmission path at substantially all of said wavelengths $\lambda_1 \ldots \lambda_N$ is nominally zero.

2. System according to claim 1, wherein said dispersion slope in the wavelength range $\lambda_1 \ldots \lambda_N$ is more negative than −0.1 ps/nm².km.

3. System according to claim 2, wherein the dispersion slope in the wavelength range $\lambda_1 \ldots \lambda_N$ is more negative than −0.5 ps/nm².km.

4. System according to claim 3, wherein the dispersion slope in the wavelength range $\lambda_1 \ldots \lambda_N$ is more negative than 1.0 ps/nm².km.

5. System according to claim 1, wherein said dispersion compensating second single mode optical fiber has total length selected such the total chromatic dispersion of the transmission path at one of the wavelengths $\lambda_1 \ldots \lambda_N$ is nominally zero, said wavelength to be designated $\lambda_m$, and wherein said DSCF is selected to have nominally zero chromatic dispersion at $\lambda_m$.

6. System according to claim 1, wherein at least one of the first single mode optical fiber, the dispersion compensating second single mode optical fiber, and the DSCF is not present in the transmission path as a continuous length of optical fiber.

7. System according to claim 1, wherein N is greater than 2.

8. System according to claim 1, wherein the DSCF has a refractive index profile comprising, in sequence from a longitudinal axis of the DSCF, a core having refractive index greater than $n_o$, an inner depressed cladding region having refractive index less than $n_o$, an index ring having a refractive index equal to or greater than $n_o$, and an outer depressed cladding region having a refractive index less than $n_o$, where $n_o$ is the refractive index of vitreous silica.

9. A dispersion slope compensating optical fiber having a refractive index profile selected to provide the fiber with nominally zero chromatic dispersion D at a predetermined wavelength $\lambda_m$ and a dispersion slope D' more negative than −0.1 ps/nm².km over a wavelength range $\lambda_1 \ldots \lambda_N$ that contains $\lambda_m$, said wavelength range being at least 12 nm.

10. Dispersion slope compensating optical fiber according to claim 9 having D' more negative than −0.5 ps/nm².km.

\* \* \* \* \*